(12) United States Patent
Shimizu et al.

(10) Patent No.: US 7,088,986 B2
(45) Date of Patent: Aug. 8, 2006

(54) ELECTRONIC APPARATUS

(75) Inventors: Akira Shimizu, Kawagoe (JP);
Takahiro Sasaki, Kawagoe (JP);
Nobumitsu Kasahara, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 408 days.

(21) Appl. No.: 10/277,876

(22) Filed: Oct. 23, 2002

(65) Prior Publication Data
US 2003/0083039 A1  May 1, 2003

(30) Foreign Application Priority Data
Oct. 26, 2001  (JP) ............................ 2001-329767

(51) Int. Cl.
*H04B 1/08* (2006.01)
*H04B 1/06* (2006.01)

(52) U.S. Cl. ...................... 455/347; 455/345; 361/826; 381/86

(58) Field of Classification Search ............... 455/41.2, 455/41.3, 344, 345, 346, 347, 348, 349, 351, 455/556.1, 557, 566, 575.1; 369/75.1, 57.2, 369/75.2; 361/814, 826; 381/86, 87
See application file for complete search history.

(56) References Cited

U.S. PATENT DOCUMENTS

| | | | |
|---|---|---|---|
| 4,947,457 A | * | 8/1990 | Shin ............................ 455/345 |
| 5,097,392 A | | 3/1992 | Tanaka et al. |
| 5,303,422 A | * | 4/1994 | Tsukuda ..................... 455/346 |
| 5,953,302 A | | 9/1999 | Kobayashi |

FOREIGN PATENT DOCUMENTS

| | | |
|---|---|---|
| DE | 400 00 425 A1 | 10/1990 |
| DE | 196 43 282 A1 | 4/1998 |
| WO | WO 98/17502 * | 4/1998 |

* cited by examiner

*Primary Examiner*—Quochien B. Vuong
(74) *Attorney, Agent, or Firm*—Young & Thompson

(57) ABSTRACT

An electronic apparatus includes: a front panel provided at a front surface of apparatus main body; and a holding mechanism that detachably holds the front panel against the apparatus main body. The holding mechanism has engaging member formed in one of the front panel and the apparatus main body and engaged member formed in the other of the front panel and the apparatus main body, and the engaging member and the engaged member are each provided with a connection terminal so that the engaged member is engaged with the engaging member to electrically connect the front panel and the apparatus main body together via the connection terminal.

20 Claims, 9 Drawing Sheets

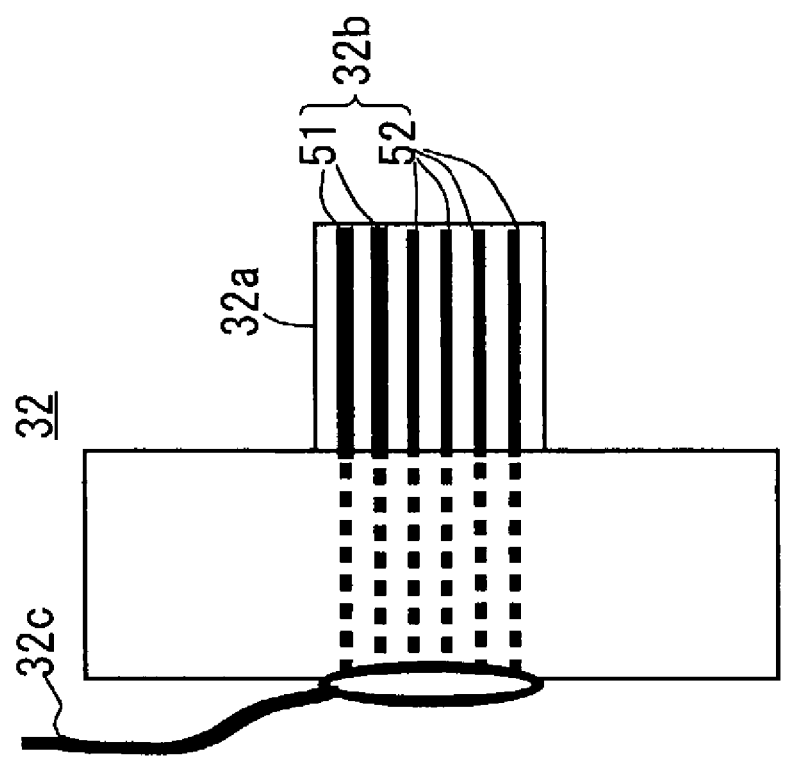

ELECTRONIC APPARATUS

BACKGROUND OF THE INVENTION

1. Field of the Invention

The present invention relates to electronic apparatus in which a front panel is detachably installed on an apparatus main body, and in particular, to a technique of ensuring an electric connection between a front panel and the apparatus main body.

2. Description of the Related Art

Vehicle-mounted AV (Audio/Visual) apparatuses are conventionally known in which a front panel provided with operation buttons and a display is detachably installed on an apparatus main body. FIG. 8 is a conceptual drawing of a structure of a conventional vehicle-mounted AV apparatus as viewed from a diagonal front of the apparatus. As shown in FIG. 8, an apparatus main body 81 of a vehicle-mounted AV apparatus 300 is provided with a plate 83 that can move between a position at which it covers a front surface of the vehicle-mounted AV apparatus 300 (position (A) shown in FIG. 8) and a position at which it opens the front surface (portion (B) shown in FIG. 8. Further, a front panel 82 is detachably held against the plate 83 by holding mechanisms 84 formed at longitudinally opposite ends of a back surface of the front panel 82 and at longitudinally opposite ends of a front surface of the plate 83. Further, the front surface of the plate 83 and the back surface of the front panel 82 are provided with detach connectors 83a and 82a, respectively. The detach connectors 83a and 82a are connected together to supply power from the apparatus main body 81 to the front panel 82 and to allow electric signals to be transmitted between the apparatus main body 81 and the front panel 82.

However, in the conventional vehicle-mounted AV apparatus 300, the holding mechanisms 84 are formed at the longitudinally opposite ends of the front panel 82 and plate 83. Thus, there is a inconvenience that both front panel 82 and plate 83 may be warped.

For example, FIG. 9 is a conceptual drawing of connecting a section between the detach connector 82a provided on the front panel 82 and the detach connector 83a of the plate 83, as viewed from a side of the apparatus. As shown in FIG. 9, the front panel 82 is warped in projecting form, whereas the plate 83 is warped in recess form. As a result, contact pressure is reduced to make contact failure at a connector terminal near a central portion between the detach connector 83a and the detach connector 82a. Thereby, a inconvenience may occur with power supply from the apparatus main body 81 to the front panel 82 and thus with transmission of electric signals from the apparatus main body 81 to the front panel 82.

The amount of information on the display of the front panel 82 and on operational instructions therefor is expected to increase in the future. Accordingly, an increase in number of connector terminals in the detach connector is not avoidable and may make the above inconvenience marked.

SUMMARY OF THE INVENTION

It is therefore an object of the present invention to provide an electronic apparatus in which even if a front surface is warped, power can be reliably supplied to the front panel to ensure that electric signals are transmitted between the front panel and an apparatus main body.

The above object of the present invention can be achieved by an electronic apparatus provided with: a front panel provided at a front surface of apparatus main body; and a holding mechanism that detachably holds the front panel against the apparatus main body, wherein the holding mechanism has engaging member formed in one of the front panel and the apparatus main body and engaged member formed in the other of the front panel and the apparatus main body, and the engaging member and the engaged member are each provided with a connection-terminal so that the engaged member is engaged with the engaging member to electrically connect the front panel and the apparatus main body together via the connection terminal.

According to the present invention, the engaged member are engaged with the engaging member to electrically connect the front panel and the apparatus main body together via the connection terminals. Consequently, even if the front panel is warped, the engagement results in urging force that ensures that the front panel and the apparatus main body can be electrically connected together without being inappropriately contacted with each other.

In one aspect of the electronic apparatus of the present invention, the engaged member is engaged with the engaging member to supply power from the apparatus main body to the front panel via the connection terminal.

According this aspect, even if the front panel is warped, the engagement of the engaged member with the engaging member results in urging force that ensures that the front panel and the apparatus main body can be electrically connected together without being inappropriately contacted with each other. Consequently, power can be reliably supplied to the front panel.

In another aspect of the electronic apparatus of the present invention, the front panel is provided with an operation member that accepts a predetermined operational instruction from the user, and the engaged member is engaged with the engaging member to transmit an electric signal corresponding to the operational instruction, via the connection terminal from the front panel to the apparatus main body.

According this aspect, even if the front panel is warped, the engagement of the engaged member with the engaging member results in urging force that ensures that the front panel and the apparatus main body can be electrically connected together without being inappropriately contacted with each other. Consequently, electric signals corresponding to operational instructions can be reliably transmitted from the front panel to the apparatus main body.

In further aspect of the electronic apparatus of the present invention, the front panel is provided with a display that displays a predetermined content, and the engaged member is engaged with the engaging member to transmit an electric signal corresponding to contents to be displayed on the display via the connection terminal, from the apparatus main body to the front panel.

According this aspect, even if the front panel is warped, the engagement of the engaged member with the engaging member results in urging force that ensures that the front panel and the apparatus main body can be electrically connected together without being inappropriately contacted with each other. Consequently, electric signals corresponding to contents to be displayed on the display can be reliably transmitted from the apparatus main body to the front panel.

In further aspect of the electronic apparatus of the present invention, the electronic apparatus is provided with a communication device for transmitting an electric signal from the front panel to the apparatus main body by short distance radio communication, wherein the front panel is provided with an operation member that accepts an operational instruction from a user, and the electric signal corresponding to the operational instruction is transmitted from the front panel to the apparatus main body by the short distance radio communication.

According this aspect, even if the front panel is warped, the engagement of the engaged member with the engaging member results in urging force that ensures that power is supplied to the front panel. Further, electric signals corresponding to operational instructions can be reliably transmitted from the front panel to the apparatus main body by short distance radio communication.

In still further aspect of the electronic apparatus of the present invention, the electronic apparatus is provided with a communication device for transmitting an electric signal from the apparatus main body to the front panel by short distance radio communication, wherein front panel is provided with a display that displays a predetermined content, and an electric signal corresponding to the content to be displayed on the display is transmitted from the apparatus main body to the front panel by the short distance radio communication.

According this aspect, even if the front panel is warped, the engagement of the engaged member with the engaging member results in urging force that ensures that power is supplied to the front panel. Further, electric signals corresponding to contents to be displayed on the display can be reliably transmitted from the apparatus main body to the front panel by short distance radio communication.

The above object of the present invention can be achieved by an electronic apparatus provided with: a plate that can move between a position at which the plate is electrically connected to the apparatus main body to cover the front surface of the apparatus main body and a position at which the plate opens the front surface, a front panel; and a holding mechanism that detachably holds the front panel against the plate, wherein the holding mechanism has engaging member formed in one of the front panel and the plate and engaged member formed in the other of the front panel and the plate, and the engaging member and the engaged member are each provided with a connection terminal so that the engaged member is engaged with the engaging member to electrically connect the front panel and the apparatus main body together via the connection terminal.

According to the present invention, the engaged member are engaged with the engaging member to electrically connect the front panel and the apparatus main body together via the connection terminal. Consequently, even if the front panel is warped, the engagement results in urging force that ensures that the front panel and the apparatus main body can be electrically connected together without being inappropriately contacted with each other.

The above object of the present invention can be achieved by an electronic apparatus provided with: a front panel provided at a front surface of apparatus main body; a holding mechanism that detachably holds the front panel against the apparatus main body; and a communication device for transmitting an electric signal between the front panel and the apparatus main body by short distance radio communication, wherein if the front panel is held against apparatus main body by the holding mechanism, a transmission path for electric signals based on the short distance radio communication is established between the front panel and the apparatus main body through the communication device.

According to the present invention, the short distance radio communication serves to ensure that a transmission path for electric signals can be established. Consequently, even if the front panel is warped, it is ensured that electric signals corresponding to contents to be displayed on the display can be reliably transmitted from the apparatus main body to the front panel or electric signals corresponding to operational instructions can be reliably transmitted from the front panel to the apparatus main body.

BRIEF DESCRIPTION OF THE DRAWINGS

FIG. 3 is a diagram showing a connection terminal 32*b* provided on a lock protrusion 32*a*;

DETAILED DESCRIPTION OF THE PREFERRED EMBODIMENTS

A preferred embodiment of the present invention will be described below with reference to the drawings. The following description relates to an embodiment in which electronic apparatus according to the present invention is applied to a vehicle-mounted AV apparatus.

First, a configuration of the vehicle-mounted AV apparatus according to this embodiment will be described in detail.

Figure 1A:
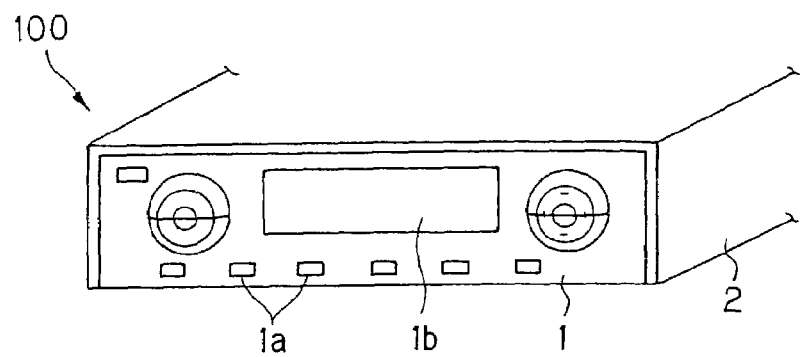
FIGS. 1A to 1C are a conceptual drawing of a structure of a vehicle-mounted AV apparatus 100 according to this embodiment, as viewed from a diagonal front of the AV apparatus.
Figure 1B:
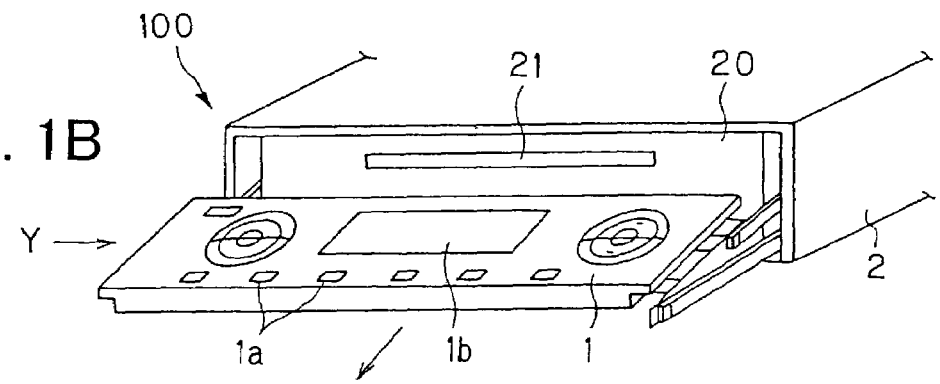
Figure 1C:
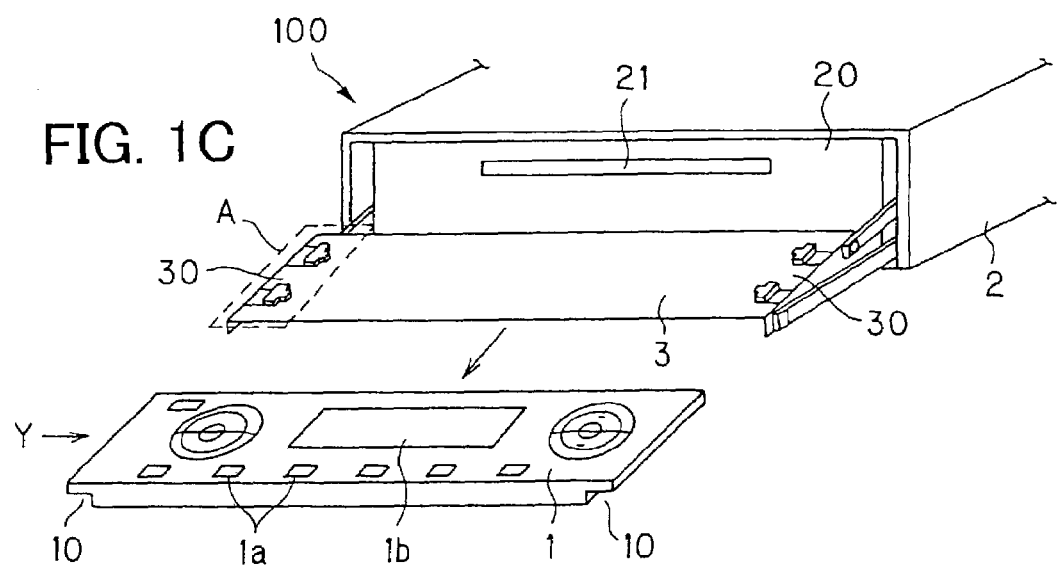

FIGS. 1A to 1C are a conceptual drawing of the structure of a vehicle-mounted AV apparatus 100 in this embodiments viewed from a diagonal front of the apparatus. FIG. 1A denotes a state in which a front panel 1 is installed on and held against a plate 3 (not shown) of an apparatus main body 2 as an apparatus main body to cover a front surface 20 of the apparatus main body 2. FIG. 1B denotes a state in which the front surface 20 of the apparatus main body 2 is opened with the front panel 1 remaining installed on and held against the plate 3 (not shown) of the apparatus main body 2. FIG. 1C denotes a state in which the front panel 1 is released from being held in the plate 3 and taken out from the apparatus main body 2.

The plate 3, shown in FIG. 1C, is provided at the front surface 20 of the apparatus main body 2 so as to move between a position at which it covers the front surface 20 of the apparatus main body 2 (the state shown in FIG. 1A) and a position at which it opens the front surface 20 (the state shown in FIGS. 1B and 1C). The plate 3 is also electrically connected to the apparatus main body 2. Further, at the side of the front surface 20 of the apparatus main body 2, for example, there is provided an insertion port 21 into which a recording medium such as a CD-ROM or a DVD-ROM with music or the like recorded thereon is inserted. The present invention is not directly related to the details of a mechanism for moving the plate 3 between the position at which it covers the front surface 20 of the apparatus main body 2 and the position at which it opens the front surface 20. Thus, the details are omitted.

The plate 3 holds the front panel 1 using a holding mechanism composed of engaged members 30 formed at the longitudinally opposite ends of the front surface of the plate 3 and engaging members 10 formed at the longitudinally opposite ends of the back surface of the front panel 1.

The front panel 1 has a plurality of operation buttons 1*a* provided on a front surface thereof as operation member for accepting predetermined operational instructions from a user, and a display 1*b* (for example, a liquid crystal display) that displays predetermined contents, for example, the names of musical pieces.

Next, the configuration and functions of the holding mechanism, composed of the engaged members 30 and the engaging members 10, will be described.

Figure 2A:
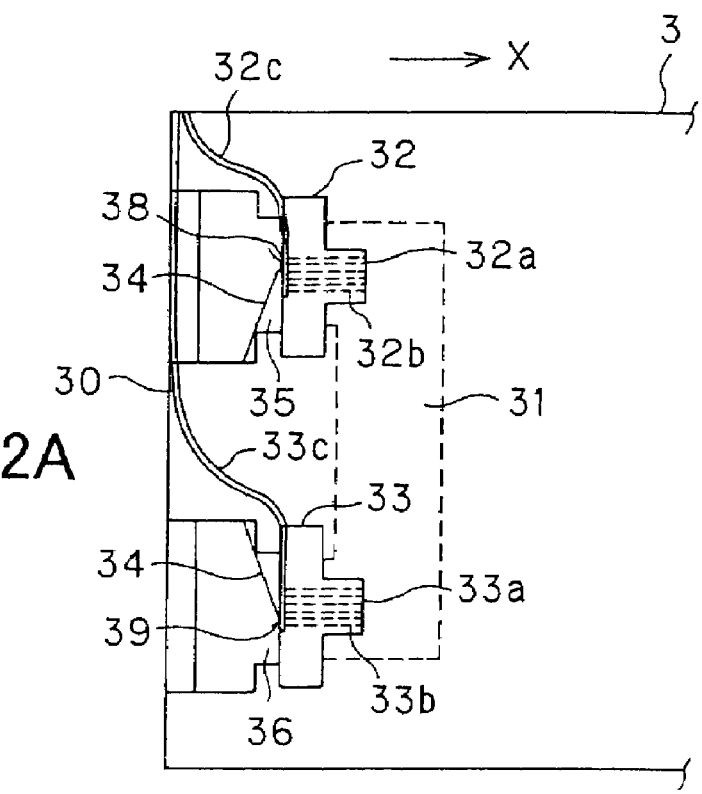
FIGS. 2A and 2B are a diagram showing engaged members 30 formed on a plate 3.
Figure 2B:
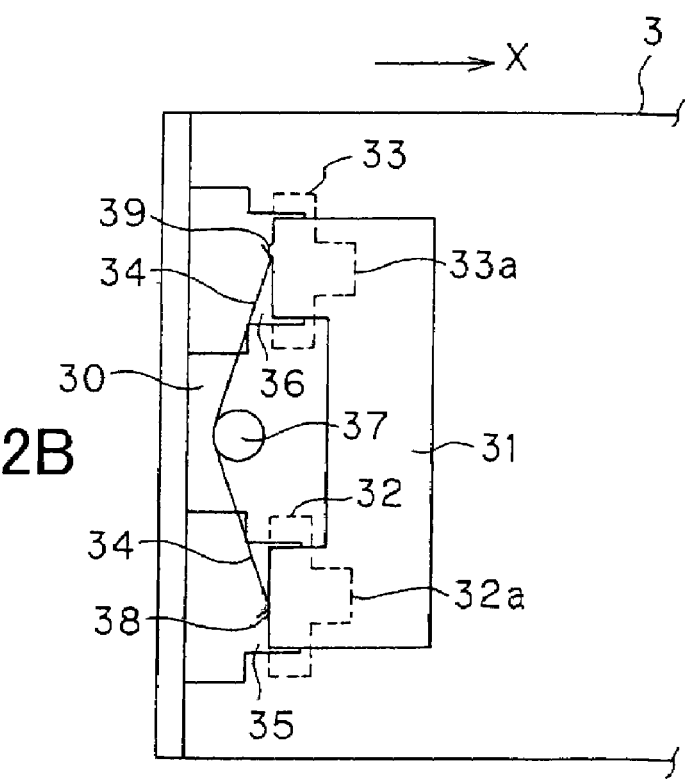

FIGS. 2A and 2B are a diagram showing the engaged member 30, formed in the plate 3. FIG. 2A is an enlarged view of a portion A, which is shaded in FIG. 1C. FIG. 2B is a diagram showing the plate 3, shown in FIG. 2A, as viewed from the back surface thereof.

The engaged members 30 are formed at the longitudinally opposite ends of the front surface of the plate 3. However, since these engaged members 30 have similar configurations, only one of the engaged members 30, arranged at the longitudinally opposite ends, will be described. Further, only one of the engaging members 10, formed at the longitudinally opposite ends, will be described.

As shown in FIGS. 2A and 2B, the engaged member 30 is composed of lock members 32 and 33 integrally connected together by using a connection member 31, and a spring 34 that urges the lock members 32 and 33 in a direction X in the drawing. The lock members 32 and 33 are arranged along the plane of the plate 3 in a direction perpendicular to the longitudinal direction of the plate 3, and are penetrated through notches 35 and 36 formed at the opposite ends of the plate 3.

A central portion of the spring 34 is wound around a fixed pin 37 projecting from the back surface of the plate 3, and opposite ends 38 and 39 thereof are joined to the bottoms of the lock members 32 and 33, respectively. That is, the spring 34 urges the lock members 32 and 33 in the direction of an arrow X, shown in FIG. 2A, i.e. in the longitudinally inner direction of the plate 3 around the central portion thereof, wound around the fixed pin 37.

Further, the lock members 32 and 33 have projecting lock protrusions 32*a* and 33*a*, respectively, at the top thereof, located at the front surface of the plate 3. The tips of the lock protrusions 32*a* and 33*a* are arranged to extend toward the center of the plate 3 and parallel with each other.

The lock protrusions 32*a* and 33*a* have connection terminals 32*b* and 33*b* provided on the back surface thereof. The connection terminals 32*b* and 33*b* are connected to an electric circuit mounted inside the apparatus main body 2 via metallic multicore wires 32*c* and 33*c*. That is, a total of four lock protrusions are provided at the longitudinally opposite ends of the front surface of the plate 3, and each has the connection terminal.

FIG. 3 is a diagram showing the connection terminal 32*b* provided on the lock protrusion 32*a*. As shown in FIG. 3, the connection terminal 32*b* is composed of two power supply electrode wires (positive and negative electrodes) 51 and a plurality of signal electrode wires (metallic print wires) 52. These electrode wires are insulated from one another. The power supply electrode wires (positive and negative electrodes) 51 are used to supply power from the apparatus main body 2 to the front panel 1. The plurality of signal electrode wires 52 are used to transmit predetermined electric signals from the apparatus main body 2 to the front panel 1 or from the front panel 1 to the apparatus main body 2. The power supply electrode wires (positive and negative electrodes) 51 may be provided on only one of the four lock protrusions. Further, the power supply positive electrode wire 51 may be provided on the lock protrusion 32*a*, while the power supply negative electrode wire 52 may be provided on the lock protrusion 32*a*. The connection terminals may be formed on the lock protrusions by, for example, contact bonding or welding.

Figure 4A:
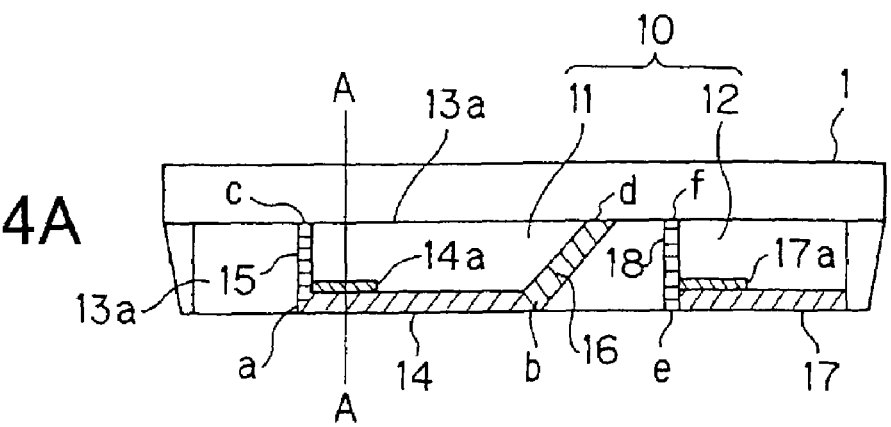
FIGS. 4A and 4B are a diagram showing engaging members 10 formed on a front panel 1.
Figure 4B:
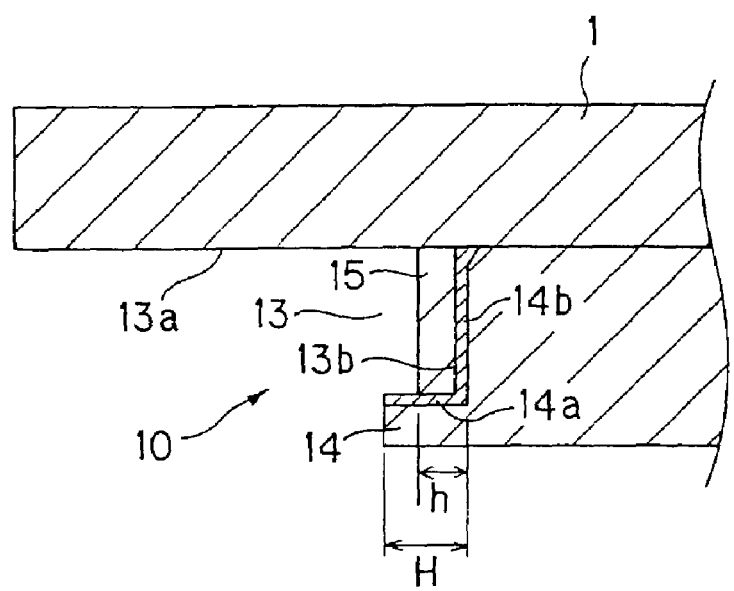

FIGS. 4A and 4B are a diagram showing the engaging members 10, formed on the front panel. FIG. 4A is a diagram of the engaging portion 10 as viewed in the direction of arrow Y in FIG. 1C. FIG. 4B is a diagram showing a part of a cross section taken along a line A—A in FIG. 4A.

The engaging member 10 is composed of engagement grooves 11 and 12 as shown in FIGS. 4A and 4B. The engagement grooves 11 and 12 correspond to the lock members 32 and 33, respectively.

The engagement groove 11 has an engagement wall 14 extending from a bottom surface portion 13*b* of a recess 13 formed in the back surface of the front panel 1, the engagement wall 14 extending parallel with a side surface portion 13*a* of the recess 13, engaging with the lock member 32 and having a height H, a locking wall 15 extending from the bottom surface portion 13*b* perpendicularly to the side surface portion 13*a* so that one side portion thereof is joined to one side portion of the engagement wall 14 (a joined portion a in FIG. 4A), the locking wall 15 having a height h smaller than the height H of the engagement wall 14, and a tilted wall 16 extending from the bottom surface portion 13*b* so that one side portion thereof is joined to the other side portion of the engagement wall 14 (a joined portion b in FIG. 4A), the tilted wall 16 having the height H, which is the same as that of the engagement wall 14. Further, the other wall portion of the tilted wall 16 and the other wall portion of the locking wall 15 are each joined to the side surface portion 13*a* of the recess 13 (joined portions c and d in FIG. 4A).

Further, the engagement groove 12 has an engagement wall 17 extending from the bottom surface portion 13*b* of the recess 13 formed in the back surface of the front panel 1, the engagement wall 17 extending parallel with the side surface portion 13*a* of the recess 13, engaging with a lock member 33 and having the height H, and a locking wall 18 extending from the bottom surface portion 13*b* perpendicularly to the side surface portion 13*a* so that one side portion thereof is joined to one side portion of the engagement wall 17 (a joined portion e in FIG. 4A), the locking wall 18 having the height h smaller than the height H of the engagement wall 17. The other side portion of the locking wall 18 is joined to the side surface portion 13*a* of the recess 13 (a joined portion f in FIG. 4A).

The engagement grooves 11 and 12 are arranged so that the tilted wall 16 of the engagement groove 11 and the locking wall 18 of the engagement wall 12 are located close to each other along the back surface of the front panel 1 in a direction perpendicular to the longitudinal direction of the front panel 1. Further, the joined portion b and joined portion d are not located opposite each other but are located so that the joined portion d is closer to the locking wall 18 than the engaged portion b. That is, the positions of the joined portions deviate from each other, thereby allowing the tilted wall 16 to extend from the bottom surface portion 13*b* so as to tilt away from the locking wall 18.

And, the engagement wall 14 of the engagement groove 11 and the engagement wall 17 of the engagement groove 12 are provided with connection terminals 14*a* and 17*a*, respectively, composed of metal. The connection terminals 14*a* and 17*a* are connected to the electric circuit in the front panel 1 via the metallic multicore wires 14*b* and 17*b*, respectively. That is, a total of four engagement walls are provided at the longitudinally opposite ends of the front surface of the front panel 1, and each have the connection terminal.

Figure 5:
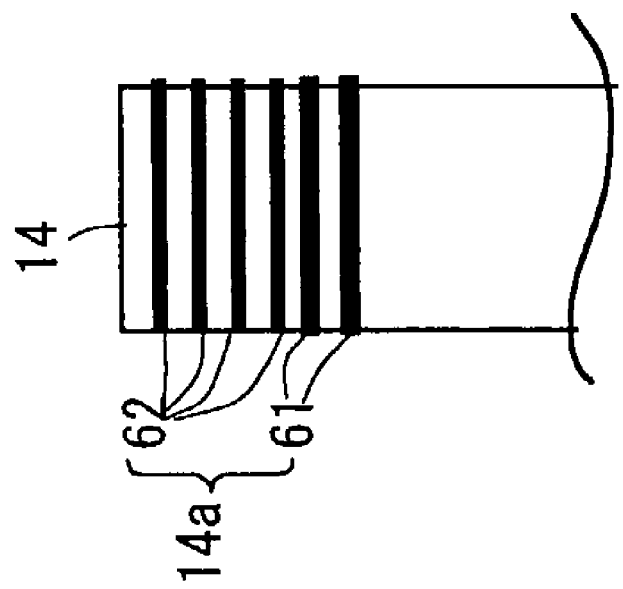
FIG. 5 is a diagram showing a connection terminal 14*a* provided on an engagement wall 14.

FIG. 5 shows the connection terminal 14*a*, provided on the engagement wall 14. As shown in FIG. 5, the connection terminal 14*a* is composed of two power supply electrode wires (positive and negative electrodes) 61 and a plurality of signal electrode wires 62. These electrode wires are insulated from one another.

The two power supply electrode wires (positive and negative electrodes) 61 correspond to the two power supply electrode wires (positive and negative electrodes) 51 on the connection terminal 32*a* of the lock protrusion 33*a* of the plate 3, described above. If the engaged members 30 formed in the plate 3 are engaged with the engaging members 10 formed on the front panel 1, the power supply electrode wires (positive and negative electrodes) 61 abut against the power supply electrode wires (positive and negative electrodes) 51.

Further, the plurality of signal electrode wires 62 correspond to the signal electrode wires 52 on the connection terminal 32*b* of the lock protrusion 33*a* of the plate 3, described above. If the engaged members 30 formed in the plate 3 are engaged with the engaging members 10 formed on the front panel 1, the signal electrode wires 62 abut against the signal electrode wires 52. The power supply electrode wires (positive and negative electrodes) 61 and the plurality of signal electrode wires 62 are provided on the other engagement walls so as to correspond to the connection terminals of the lock protrusions. The connection terminals can be formed on the engagement walls by, for example, contact bonding or welding.

Figure 6A:
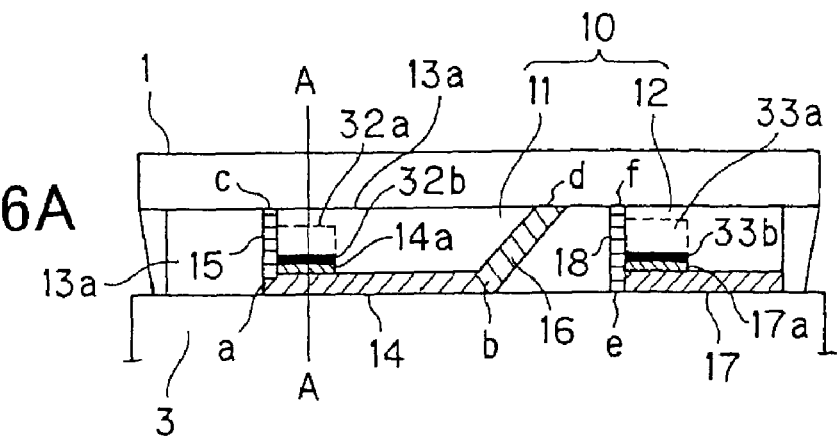
FIGS. 6A and 6B are a diagram showing that the engaged members 30, formed in the plate 3, are engaged with the engaging members 10, formed on the front panel.
Figure 6B:
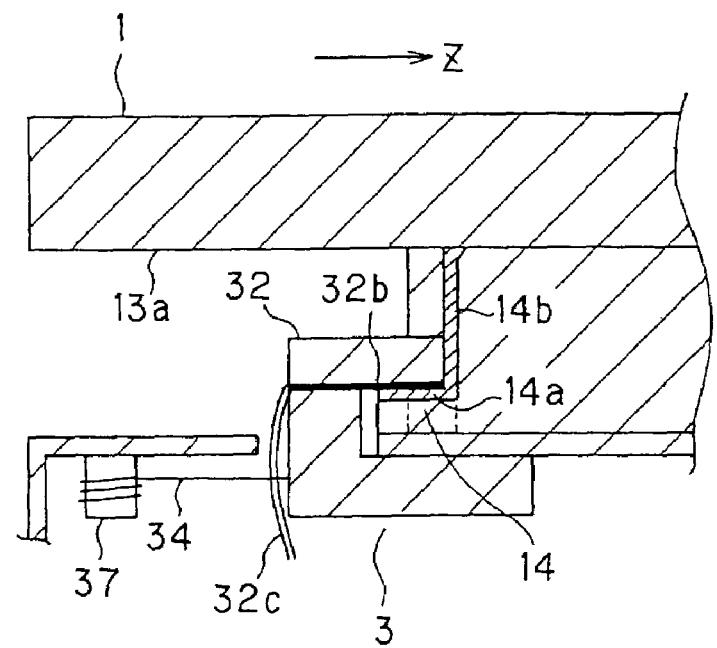

FIGS. 6A to 6B are a diagram showing that the engaged members 30, formed in the plate 3, are engaged with the engaging members 10, formed on the front panel 1. FIG. 6A is a diagram of this state as viewed in the direction of arrow Y in FIG. 1B. FIG. 6B is a diagram showing a part of a section taken along line A—A in FIG. 6A.

The engaged members 30, formed in the plate 3, are engaged with the engaging members 10, formed on the front panel 1, to hold the front panel 1 against the plate 3 of the apparatus main body 2.

More specifically, as shown in FIGS. 6A and 6B, the lock protrusion 32*a* of the lock member 32 of each engaged member 30 is engaged with the engagement wall 14 of the engagement groove 11 of the corresponding engaging member 10. Further, the lock protrusion 33*a* of the lock member 33 of each engaged member 30 is engaged with the engagement wall 17 of the engagement groove 12 of the corresponding engaging member 10. Furthermore, the spring 34 urges the lock members 32 and 33 in the direction of arrow Z in the figure. In this manner, the front panel is held.

Moreover, the lock members 32 and 33 and the engagement grooves 11 and 12 are located so that one side portion of the tip of each of the lock protrusions 32*a* and 33*a* abuts against and engages with the corresponding one of the locking walls 15 and 18.

The locking walls 15 and 18 prevent the lock protrusions 32 and 33 from being disengaged from the engagement grooves 11 and 12, respectively, owing to force exerted in a sliding direction of the plate 3 (the direction of the arrow shown in FIG. 1B) when the plate 3, with the front panel 1 installed and held thereon, is moved from the position shown in FIG. 1A to the position shown in FIG. 1B. That is, the height h of each of the locking walls 15 and 18 is such that the locking wall can withstand a load effected in the sliding direction of the plate 3 when it is moved. The locking walls 15 and 18 can each lock one side portion of the corresponding one of the lock protrusions 32*a* and 33*a* to prevent the front panel 1 from being separated from the plate 3 against the user's will.

This engagement causes the connection terminal 14*a* (the power supply electrode wires (positive and negative electrodes) 61 and the plurality of signal electrode wires 62), provided on the engagement wall 14, to abut against the connection terminal 32*b* (the power supply electrode wires (positive and negative electrodes) 51 and the plurality of signal electrode wires 52) provided on the lock protrusion 32*a*. The front panel 1 and the apparatus main body 2 are electrically connected together via these connection terminals and metallic multicore wires. The connection terminals on the other engagement walls and lock protrusions are abutted against each other as with the connection terminals 14*a* and 32*b*.

Thus, power from the apparatus main body 2 is supplied to the front panel 1 via these connection terminals or the like. Further, if the user uses the operation button 1*a* provided on the front panel 1 to instruct the apparatus on, for example, reproduction of a musical piece recorded on a CD-ROM, then an electric signal corresponding to this operational instruction is transmitted from the front panel 1 to the apparatus main body 2 via the connection terminals or the like. For example, this musical piece is reproduced by the apparatus main body 2 via speakers.

Further, an electric signal corresponding to a content to be displayed, e.g. the title of a musical piece recorded on the CD-ROM is transmitted from the apparatus main body 2 to the front panel 1 via the connection terminals or the like and then is displayed on the display 1*b*.

As described above, according to this embodiment, the engaged members 30 formed in the plate 3 are engaged with the engaging members 10 formed on the front panel 1 to electrically connect the front panel 1 and the apparatus main body 2 together via the connection terminals. Accordingly, this engagement results in urging force that ensures the front panel 1 and the apparatus main body 2 can be electrically connected together without being inappropriately contacted with each other. Consequently, even if for example, the front panel 1 is warped near a central portion thereof, power can be reliably supplied to the front panel 1. Further, electric signals can be reliably transmitted from the front panel 1 to the apparatus main body 2.

In the above embodiment, the engaged members 30 are formed at the longitudinally opposite ends of the front surface of the plate 3, whereas the engaging members 10 are formed at the longitudinally opposite ends of the back surface of the front panel 1. However, conversely, the engaging members 10 may be formed at the longitudinally opposite ends of the front surface of the plate 3, whereas the engaged members 30 may be formed at the longitudinally opposite ends of the back surface of the front panel 1.

Further, in the above embodiment, the engaged members 30 are formed at the longitudinally opposite ends of the front surface of the plate 3, whereas the engaging members 10 are formed at the longitudinally opposite ends of the back surface of the front panel 1. However, the present invention is not limited to this aspect, but the engaged and engaging members may be formed at any positions of the plate 3 and front panel 1. That is, the holding mechanism may be formed at any position as long as the front panel 1 can be reliably held against the plate 3.

Furthermore, in the above embodiment, the front panel 1 is held against the plate 3 provided in the apparatus main body 2. However, the present invention is not limited to this aspect, but the front panel 1 may be held directly against the apparatus main body without providing the plate 3. In this case, the engaging members 10 are formed on one of the front panel 1 and apparatus main body 2, whereas the engaged members 30 are formed in the other of the front panel 1 and apparatus main body 2.

In the above embodiment, electric signals are transmitted via the connection terminals of the engaging members 10 and engaged members 30. In another embodiment, only power from the apparatus main body 2 may be supplied to the front panel 1 via the connection terminals of the engaging members 10 and engaged members 30. In this case, the vehicle-mounted AV apparatus is provided with a short distance radio transmitter, e.g. a Bluetooth transmitter as communication member that transmits electric signals from the front panel 1 to the apparatus main body 2 by short distance radio communication.

The Bluetooth transmitter is mainly composed of, for example, an LSI (Large-Scale Integration), and has a short distance radio communication function based on Bluetooth, a short distance radio communication technique standard to carry out data communications with other Bluetooth transmitters by short distance radio. Specifically, an applicable Bluetooth-based communication method is a slave master method involving, depending on the contents of the relevant process, master apparatus that determines a frequency hopping pattern and slave apparatus which communicates with the master apparatus and which is controlled thereby. If the master apparatus recognizes the slave apparatus located within a radius of ten meters thereof, it executes an authentication process. That is, the master apparatus and the slave apparatus exchange their exclusive ID numbers with each other for identification, and the master apparatus generates random numbers to create a link key (encrypted key) used between the master apparatus and the slave apparatus. This authentication process connects the master apparatus and the slave apparatus together, i.e. establishes a transmission path for electric signals based on short distance radio communication to enable data communications. Instead of the Bluetooth-based short distance radio communication, another communication method may be applied which is based on a radio standard such as 802.11b or IEEE 802.11e which can realize a high throughput over a wide band or a radio standard based on diffused communication called "PulsON technology" (with this technology, it is expected that a communication speed of 1 Gbps will be realized within several years). Alternatively, infrared short distance radio communication may be applied.

Figure 7A:
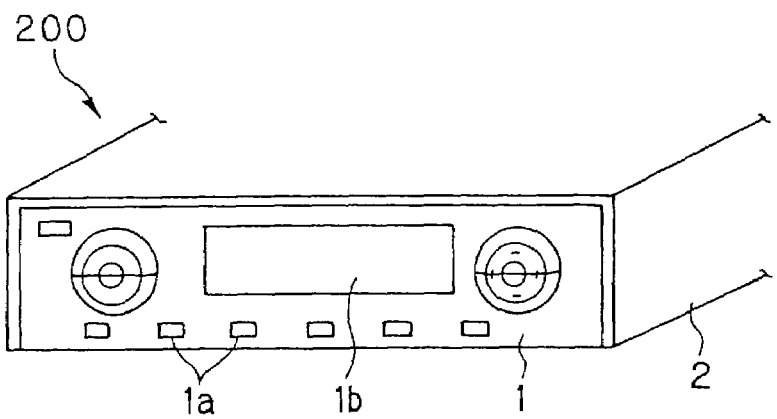
FIGS. 7A to 7C are a conceptual drawing of a structure of a vehicle-mounted AV apparatus 200 comprising a Bluetooth transmitter/receiver, as viewed from a diagonal front of the AV apparatus.
Figure 7B:
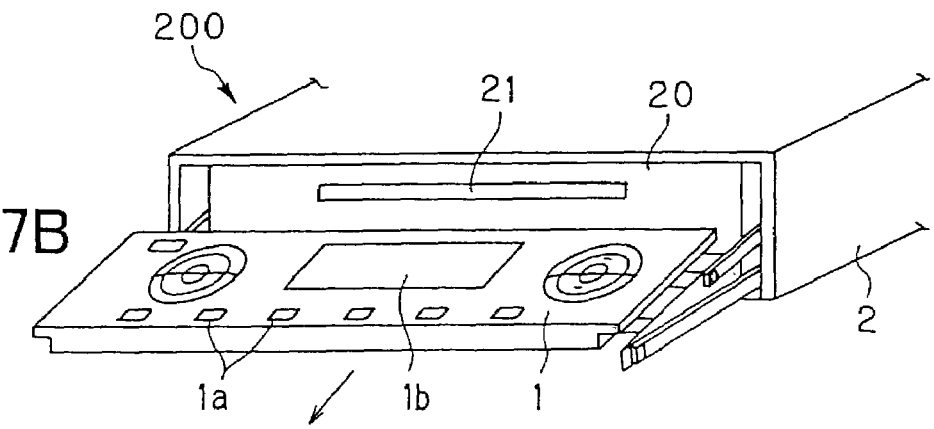
Figure 7C:
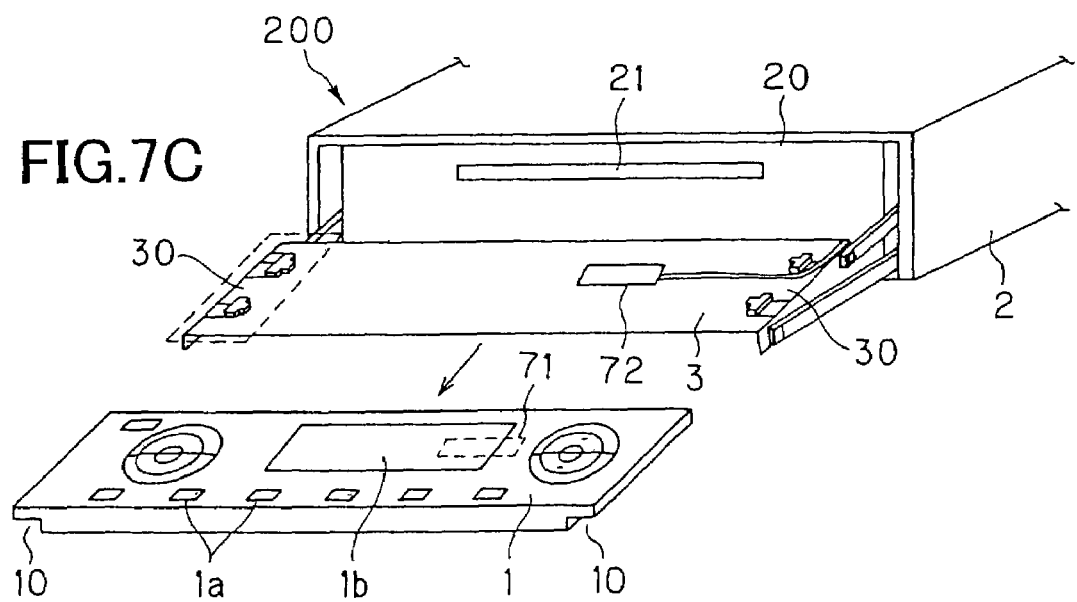
Figure 8A:
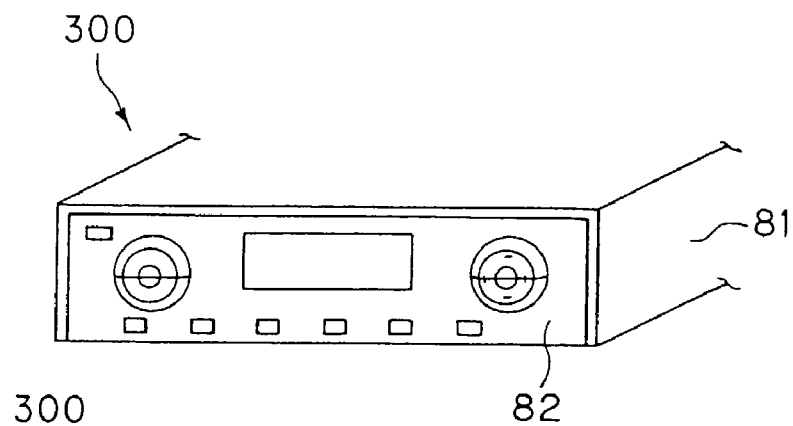
FIGS. 8A to 8C are a conceptual drawing of a structure of a conventional vehicle-mounted AV apparatus 300, as viewed from a diagonal front of the AV apparatus.
Figure 8B:
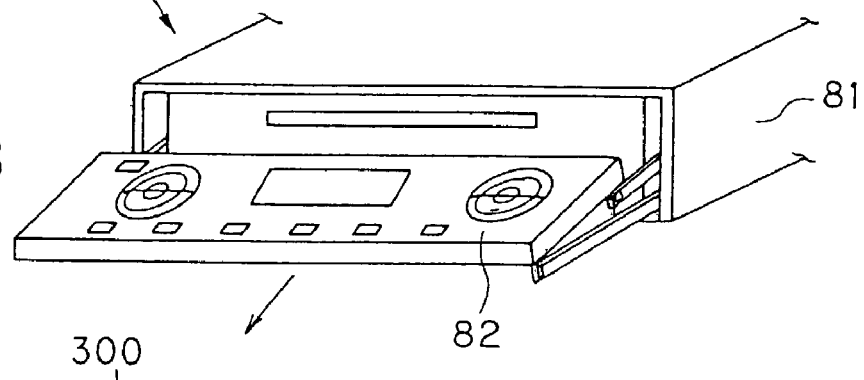
Figure 8C:
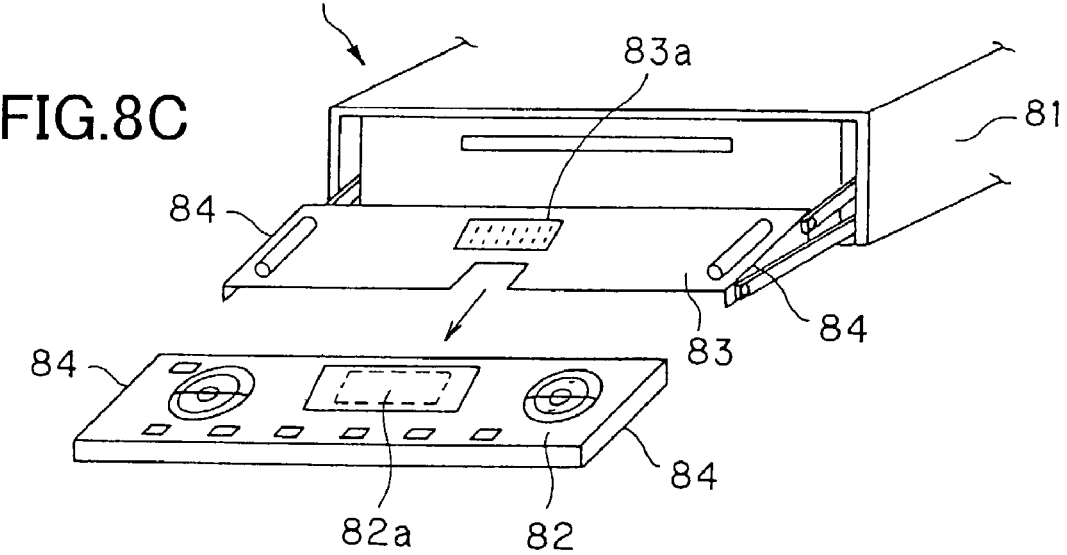
Figure 9:
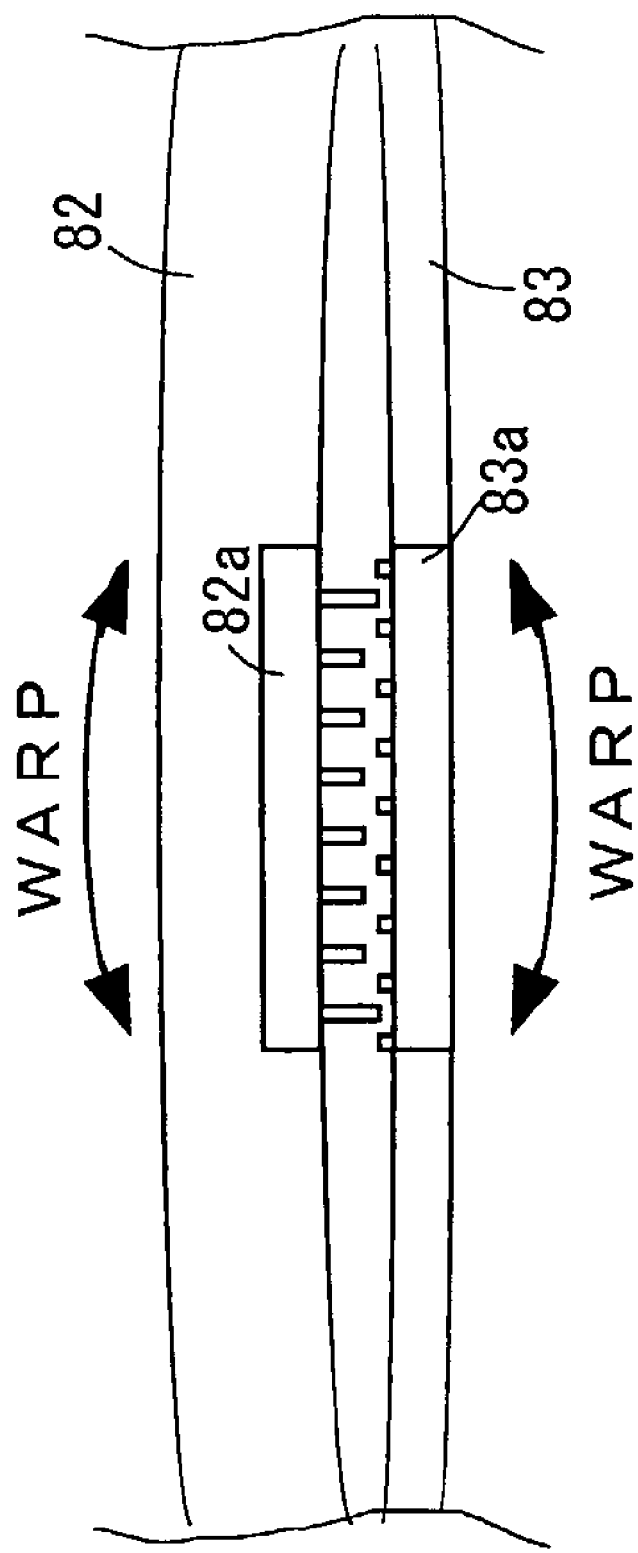
FIG. 9 is a conceptual drawing of a connection between a detach connector (male) 82*a* provided on a frame panel 82 and a detach connector (female) 83*a* of a plate 83.

FIG. 7 is a conceptual drawing of a structure of a vehicle-mounted AV apparatus 200 comprising a Bluetooth transmitter, as viewed from the diagonal front of the AV apparatus. The AV apparatus 200 is basically similar to the vehicle-mounted AV apparatus 100, shown in FIG. 1.

As shown in FIG. 7, Bluetooth transmitters 71 and 72 are installed at a predetermined position of the back surface of the front panel 1 and at the corresponding position of the front surface of the apparatus main body 2, respectively. The Bluetooth transmitter 71 is connected to the electric circuit in the front panel 1, whereas the Bluetooth transmitter 72 is connected to the electric circuit in the apparatus main body 2. The above described electric signals (predetermined operational instructions from the user or electric signals according to contents displayed on the display) are transmitted via the Bluetooth transmitters 71 and 72. This configuration allows the holding mechanism and the power supply path to be integrated together to enable power to be reliably supplied, ensuring that electric signals can be transmitted between the front panel 1 and the apparatus main body 2 similarly as in the above described embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-329767 filed on Oct. 26, 2001 including the specification, claims, drawings and summary is incorporated herein by reference in its entirety.

What is claimed is:

1. An electronic apparatus comprising:
    a front panel provided at a front surface of an apparatus main body; and
    a holding mechanism that detachably holds the front panel against the apparatus main body,
    wherein the holding mechanism has an engaging member formed in one of the front panel and the apparatus main body and an engaged member formed in the other,
    the engaged member comprising an outward protruding portion and the engaging member comprising an engagement groove configured to securely engage and lock with the protruding portion so that the front panel is held against the apparatus main body by engaging the engaging member with the engaged member with the engaged member and engaging member locked together, and
    the engagement groove of the engaging member and the protruding portion of the engaged member each provided with a connection terminal to electrically connect when the engaging member and the engaged member are engaged and locked with each other.

2. The electronic apparatus according to claim 1, wherein the engaged member is engaged with the engaging member to supply power from the apparatus main body to the front panel via the connection terminal.

3. The electronic apparatus according to claim 1, wherein the front panel is provided with an operation member that accepts a predetermined operational instruction from the user, and
    the engaged member is engaged with the engaging member to transmit an electric signal corresponding to the operational instruction, via the connection terminal from the front panel to the apparatus main body.

4. The electronic apparatus according to claim 1, wherein the front panel is provided with a display that displays a predetermined content, and
    the engaged member is engaged with the engaging member to transmit an electric signal corresponding to contents to be displayed on the display via the connection terminal, from the apparatus main body to the front panel.

5. The electronic apparatus according to claim 1, further comprising a communication device for transmitting an electric signal from the front panel to the apparatus main body by short distance radio communication,
  wherein the front panel is provided with an operation member that accepts an operational instruction from a user, and
  the electric signal corresponding to the operational instruction is transmitted from the front panel to the apparatus main body by the short distance radio communication.

6. The electronic apparatus according to claim 1, further comprising a communication device for transmitting an electric signal from the apparatus main body to the front panel by short distance radio communication,
  wherein front panel is provided with a display that displays a predetermined content, and
  an electric signal corresponding to the content to be displayed on the display is transmitted from the apparatus main body to the front panel by the short distance radio communication.

7. The electronic apparatus according to claim 1, further comprising a plate that can move between a position at which the plate is electrically connected to the apparatus main body to cover the front surface of the apparatus main body and a position at which the plate opens the front surface, wherein
  the holding mechanism detachably holds the front panel against the plate,
  the engaging member is formed in one of the front panel and the plate and the engaged member is formed in the other.

8. The apparatus of claim 1, wherein,
  the engaged member (30) comprise a lock member (32, 33),
  the lock member comprises a projecting lock protrusion (32a, 33a) at the top thereof, and
  the connection terminal of the engaged member comprises an electrical connection terminal (32b, 33b) located on a surface of the lock protrusion.

9. The apparatus of claim 8, wherein,
  the engaging member (10) is formed a back surface of the front panel with the engagement groove (11, 12) corresponding to the lock member of the engaged member,
  the engagement groove has an engagement wall (14) extending from a bottom surface portion (13b) of a recess (13) formed in the back surface of the front panel,
  the engagement wall engages with the lock member, and
  the connection (14a, 17a) of the engaging member is formed on the engagement wall.

10. An electronic apparatus comprising:
  a front panel provided at a front surface of an apparatus main body; and
  a holding mechanism that detachably holds the front panel against the apparatus main body,
  wherein the holding mechanism has engaging members formed in one of the front panel and the apparatus main body and engaged members formed in the other,
  the front panel is held against the apparatus main body by the engaging member and the engaged member being lockingly engaged with each other, and
  an engagement groove of each engaging member and a protruding portion of each engaged member each provided with a connection terminal to electrically connect when the engaging member and the corresponding engaged member are lockingly engaged with each other.

11. The apparatus of claim 10, wherein,
  the engaged members are protruding engaged members (30) formed longitudinally opposite each other; and
  the engaging members (10) are at longitudinally opposite ends of the back surface of the front panel,
  each engaged member comprises a projecting lock protrusion (32a, 33a), and
  the connection terminal of the engaged members comprises an electrical connection terminal (32b, 33b) located on a surface of the lock protrusion.

12. The apparatus of claim 11, wherein,
  each engaging member has the engagement groove (11, 12) corresponding to a corresponding engaged member,
  the engagement groove has an engagement wall (14) extending from a bottom surface portion (13b) of a recess (13) formed in the back surface of the front panel, and
  the engagement wall engages with the engaged member.

13. The apparatus of claim 12, wherein,
  the connection terminal of the engaging member is a electrical terminal (14a, 17a) formed on the engagement wall.

14. An electronic apparatus comprising:
  an apparatus main body (3);
  a front panel (1);
  a plate (3) that holds the front panel moves the front panel from a first position wherein the front panel covers a front surface (20) of the main body and a second position wherein the front surface (20) of the main body (2) is opened;
  plural first engaging parts (30) provided on a front surface of the plate;
  plural second engaging parts (10) provided on a back surface of the front panel, the first engaging parts lockingly engaging with the second engaging parts to releasably hold the front panel to the plate;
  each of the first engaging parts comprising a first electrical connection and each of the second engaging parts comprising a second electrical connection, the first and second electrical connections being electrically connected together upon the first engaging parts being lockingly engaged with the second engaging parts.

15. The apparatus of claim 14, wherein,
  the first engaging parts are protruding engaged members (30) formed at longitudinally opposite ends of the front surface of the plate; and
  the second engaging parts (10) are formed at longitudinally opposite ends of the back surface of the front panel.

16. The apparatus of claim 15,
  wherein, each longitudinally end of the front surface of the plate includes a pair of the engaged members,
  each of the pair of engaged members comprises a lock member (32, 33).

17. The apparatus of claim 16, wherein, each lock member comprises a projecting lock protrusion (32a, 33a) at the top thereof and located at the front surface of the plate, and each first electrical connection comprises an electrical connection terminal (32b, 33b) located on a surface of one of the lock protrusions.

18. The apparatus of claim 16, wherein, each of the second engaging parts comprises an engaging member with an engagement groove (11, 12) corresponding to the lock member of a corresponding engaged member.

19. The apparatus of claim 18, wherein, the engagement groove has an engagement wall (14) extending from a bottom surface portion (13b) of a recess (13) formed in the back surface of the front panel, and the engagement wall engages with the lock member.

20. The apparatus of claim 19, wherein, the second electrical connection (14a, 17a) is formed on the engagement wall.

\* \* \* \* \*